United States Patent
Lee et al.

(10) Patent No.: US 10,520,803 B2
(45) Date of Patent: Dec. 31, 2019

(54) PROJECTOR DEVICE

(71) Applicant: COLORATIVE CO., LTD., Hsinchu (TW)

(72) Inventors: Wen-Tsung Lee, New Taipei (TW); Chih-Huang Wang, Taoyuan (TW); Hsiang-Lin Yu, Taoyuan (TW); Chao-Cheng Chou, Taipei (TW); Dung-Rur Juang, Hsinchu County (TW); Ming-Chao Wu, Taipei (TW)

(73) Assignee: ARIMA COMMUNICATIONS CORP., Taipei (TW)

( * ) Notice: Subject to any disclaimer, the term of this patent is extended or adjusted under 35 U.S.C. 154(b) by 0 days.

(21) Appl. No.: 16/161,119

(22) Filed: Oct. 16, 2018

(65) Prior Publication Data

US 2019/0331999 A1 Oct. 31, 2019

(30) Foreign Application Priority Data

Apr. 27, 2018 (TW) .............................. 107114553 A

(51) Int. Cl.
| | | |
|---|---|---|
| *G03B 21/20* | (2006.01) | |
| *G03B 21/28* | (2006.01) | |
| *G03B 21/16* | (2006.01) | |
| *G03B 21/14* | (2006.01) | |
| *G03B 33/10* | (2006.01) | |
| *G03B 21/00* | (2006.01) | |

(52) U.S. Cl.
CPC ........... *G03B 21/28* (2013.01); *G03B 21/008* (2013.01); *G03B 21/145* (2013.01); *G03B 21/16* (2013.01); *G03B 21/2066* (2013.01); *G03B 33/10* (2013.01)

(58) Field of Classification Search
CPC .... G03B 21/28; G03B 21/008; G03B 21/145; G03B 21/16; G03B 21/2066; G03B 33/10
See application file for complete search history.

(56) References Cited

U.S. PATENT DOCUMENTS

| | | |
|---|---|---|
| 10,180,560 B2 | 1/2019 | Takehana et al. |
| 2011/0292355 A1* | 12/2011 | Amano .................. G02B 7/021 |
| | | 353/98 |

(Continued)

FOREIGN PATENT DOCUMENTS

| | | |
|---|---|---|
| CN | 107111099 A | 8/2017 |
| TW | 201530246 A | 8/2015 |

*Primary Examiner* — Cara E Rakowski
*Assistant Examiner* — Magda Cruz
(74) *Attorney, Agent, or Firm* — Li & Cai Intellectual Property (USA) Office

(57) ABSTRACT

A projector device includes an illumination module and an imaging module. The imaging module is connected to the illumination module and includes a housing, a relay optical system, and a projection optical system. The housing has a first annular receiving groove and a second annular receiving groove. The first annular receiving groove is closer to the illumination module than the second annular receiving groove. A center axis line of the first annular receiving groove and a center axis line of the second annular receiving groove are on the same axis line. The relay optical system includes a lens received in the first annular receiving groove. The projection optical system includes a lens and a reflecting mirror received in the second annular receiving groove. Mirror centers of the lenses and a mirror center the reflecting mirror are located on the same axis line.

10 Claims, 8 Drawing Sheets

(56) References Cited

U.S. PATENT DOCUMENTS

| | | | |
|---|---|---|---|
| 2016/0116830 A1* | 4/2016 | Lin | G02B 21/28 |
| | | | 353/97 |
| 2016/0216598 A1* | 7/2016 | Takehana | G03B 21/147 |
| 2016/0241819 A1 | 8/2016 | Chien | |
| 2016/0370691 A1* | 12/2016 | Takehana | G03B 21/142 |
| 2018/0017758 A1* | 1/2018 | Takehana | G02B 7/021 |
| 2018/0046068 A1* | 2/2018 | Hatano | G03B 21/28 |
| 2019/0137853 A1* | 5/2019 | Takehana | G03B 21/142 |

* cited by examiner

PROJECTOR DEVICE

CROSS-REFERENCE TO RELATED PATENT APPLICATION

This application claims the benefit of priority to Taiwan Patent Application No. 107114553, filed on Apr. 27, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a projector device, and more particularly to a projector device with high integration capability.

BACKGROUND OF THE DISCLOSURE

With the development of video technology, projector devices are becoming more and more popular. The projection lens used to display images clearly on a screen is one of the core components of a projector device. Due to spatial limitations of many homes or venues, the projection lens of the projector device is gradually designed to be a short-focus projection lens to achieve a clear projection effect in a small space. However, conventional projector devices usually have problems of poor integration when being assembled with optical elements such as lenses and reflecting mirrors.

In this regard, the present disclosure provides a projector device to overcome the aforementioned drawbacks.

SUMMARY OF THE DISCLOSURE

The main object of the present disclosure is to solve the drawbacks associated with the related art.

In one aspect, the present disclosure provides a projector device including an illumination module and an imaging module. The illumination module includes a light source generator and an optical processor. The light source generator is configured to generate a colored light beam. The optical processor is configured to receive the colored light beam and convert the colored light beam into an image light beam. The imaging module is connected to the illumination module, and is configured to receive the image light beam and project the image light beam onto an imaging surface. The imaging module includes a housing, a relay optical system, and a projection optical system. The housing has a first annular receiving groove and a second annular receiving groove. The first annular receiving groove and the second annular receiving groove are spaced apart from each other. The first annular receiving groove is closer to the illumination module than the second annular receiving groove. A center axis line of the first annular receiving groove and a center axis line of the second annular receiving groove are located on the same axis line. The relay optical system includes at least one lens. The lens of the relay optical system is received in the first annular receiving groove. The projection optical system includes at least one lens and a reflecting mirror. The lens and the reflecting mirror of the projection optical system are received in the second annular receiving groove. The lens of the projection optical system is located between the reflecting mirror and the relay optical system. A mirror center of the lens of the relay optical system, a mirror center of the lens of the projection optical system, and a mirror center of the reflecting mirror are located on the same axis line.

As described above, since the center axis line of the first annular receiving groove and the center axis line of the second annular receiving groove are located on the same axis line, when the lens of the relay optical system is received in the first annular receiving groove, and when the lens and the reflecting mirror of the projection optical system are received in the second annular receiving groove, the mirror center of the lens of the relay optical system, the mirror center of the lens of the projection optical system, and the mirror center of the reflecting mirror can be more easily aligned with the axis line. Accordingly, the optical elements of the imaging module present a coaxial optical element arrangement, and the integration of the projector device can be effectively improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
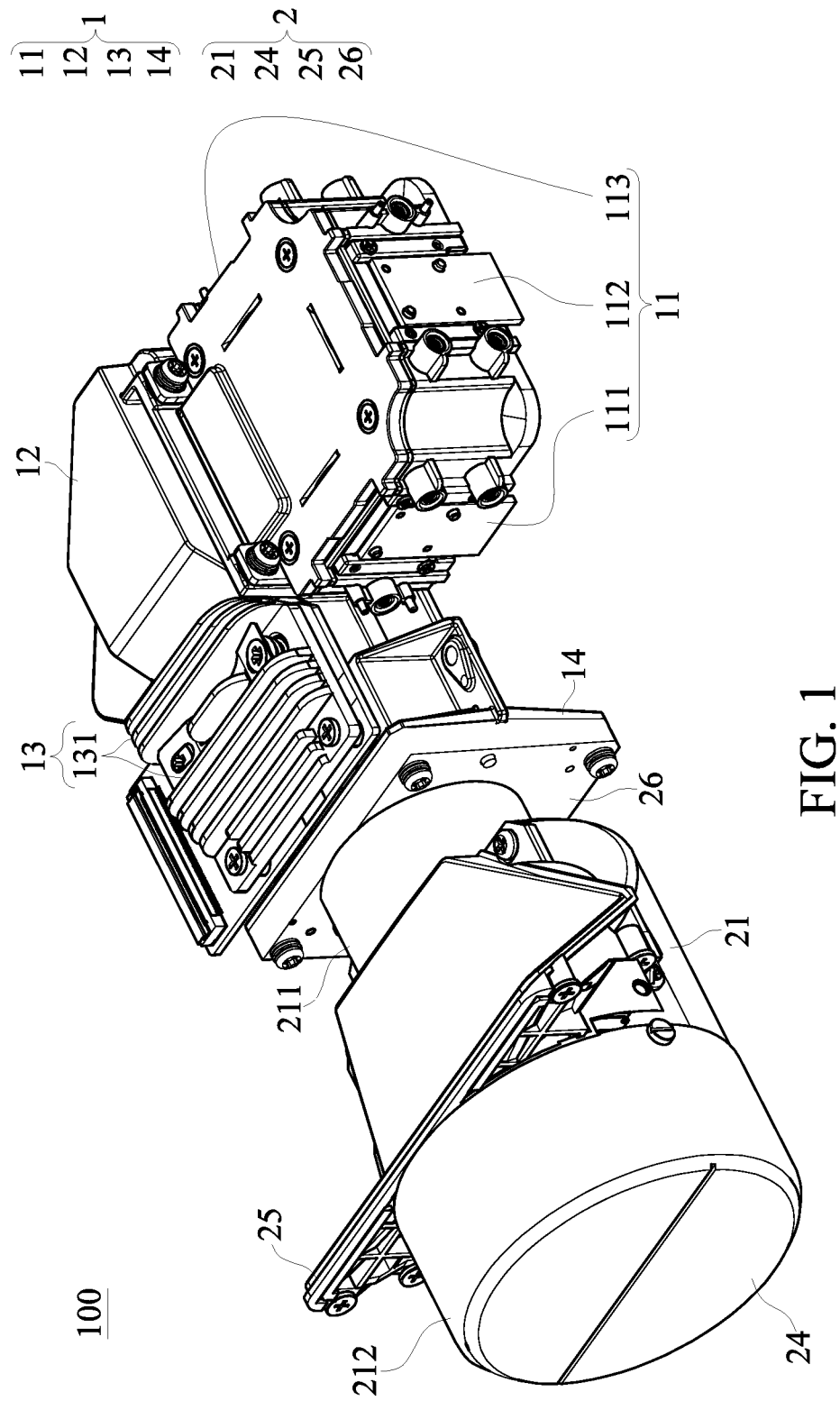
FIG. 1 is a perspective view showing a projector device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
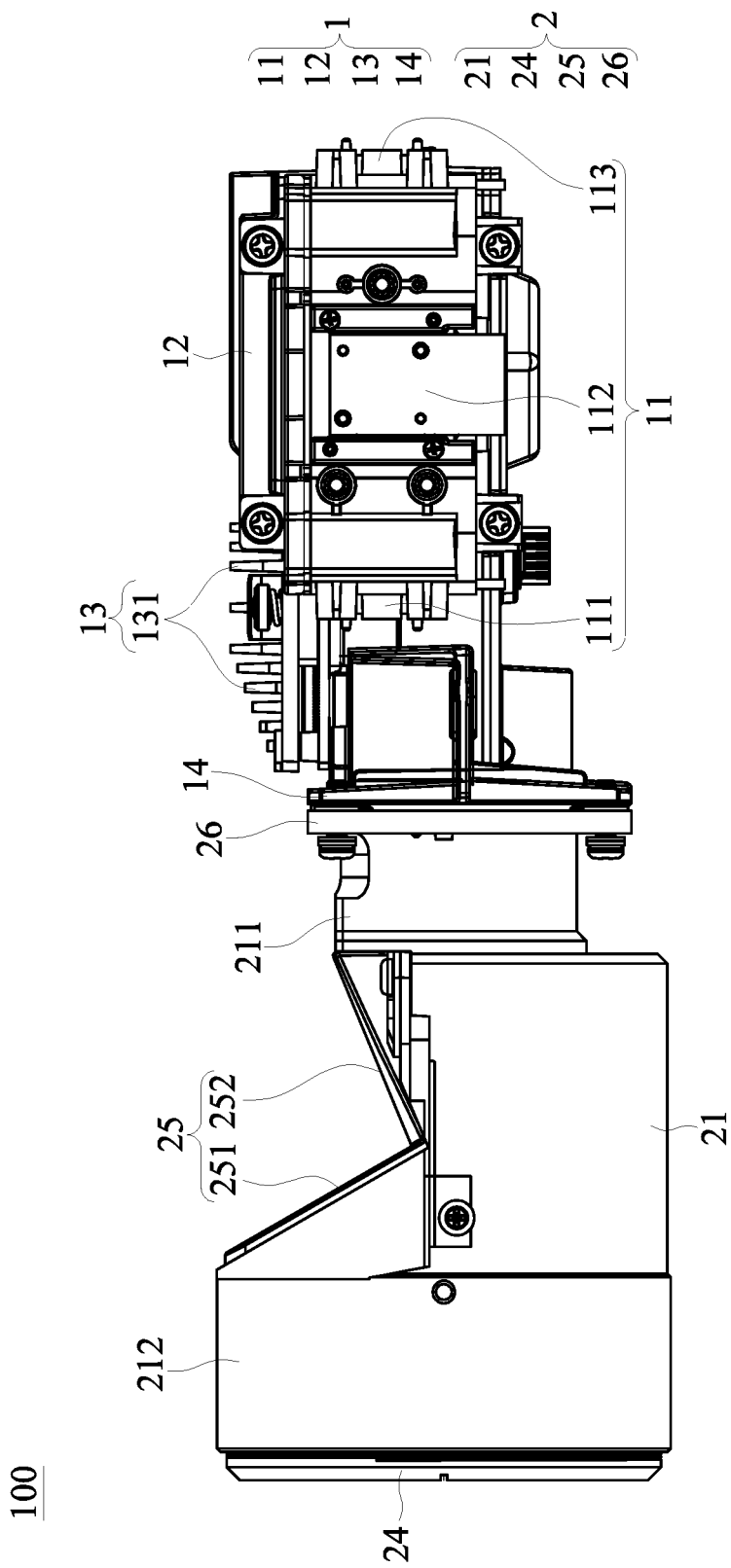
FIG. 3 is a side view showing the projector device according to the embodiment of the present disclosure.
Figure 4:
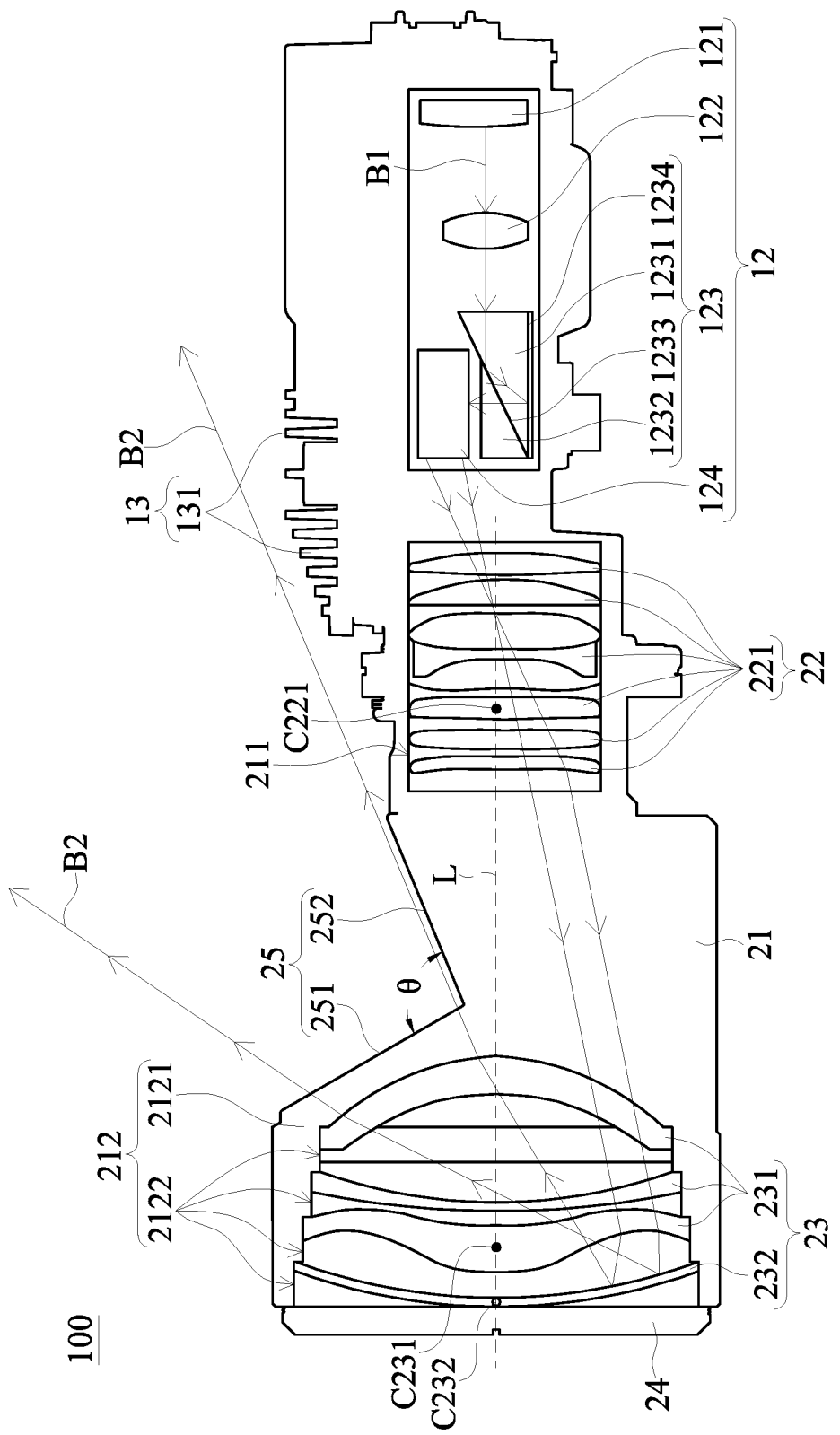
FIG. 4 is a schematic diagram showing internal optical elements of the projector device according to the embodiment of the present disclosure.
Figure 5:
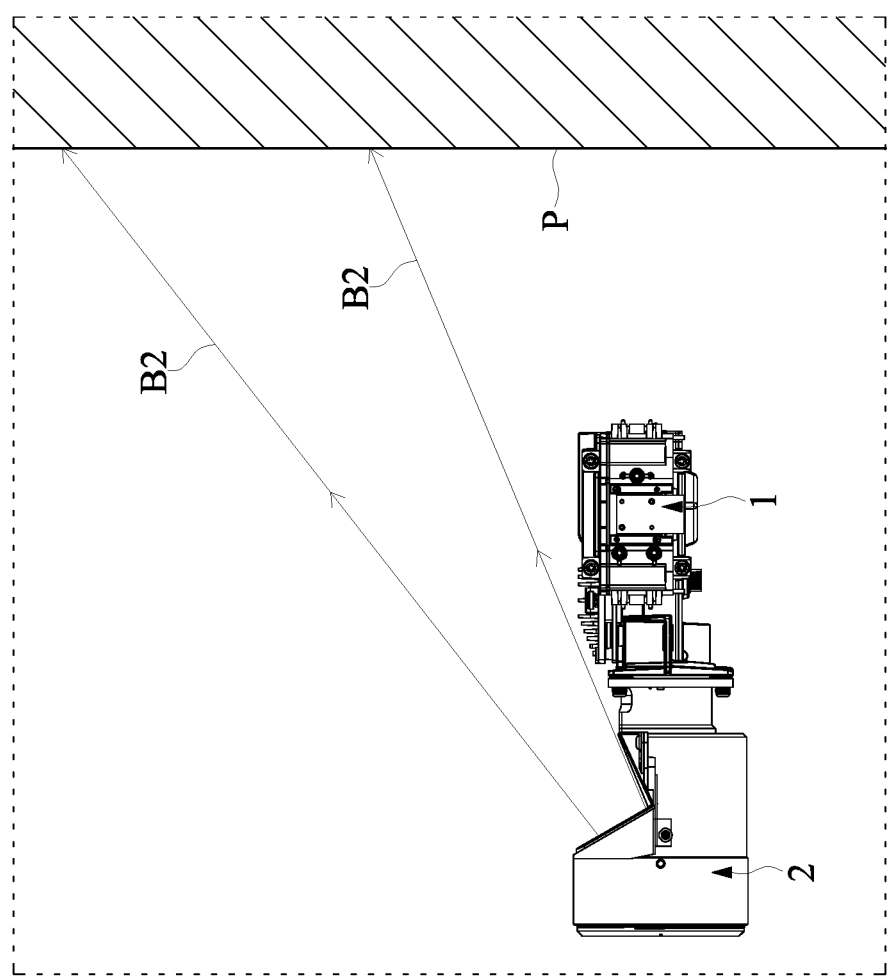
FIG. 5 is a schematic diagram showing projecting an image light beam onto an imaging surface according to the embodiment of the present disclosure.

Referring to FIG. 1 to FIG. 5, the present embodiment discloses a projector device 100. The projector device 100 includes an illumination module 1 and an imaging module 2. The illumination module 1 is configured to generate a colored light beam B1 and is configured to convert the colored light beam B1 into an image light beam B2. The imaging module 2 is connected to the illumination module 1. The imaging module 2 is configured to receive the image light beam B2 and is configured to project the image light beam B2 onto an imaging surface P (as shown in FIG. 5). The specific configurations of the respective components of the projector device 100 of the present embodiment will be separately described below, and the connection relationship between the respective components will be described in due course.

Figure 2:
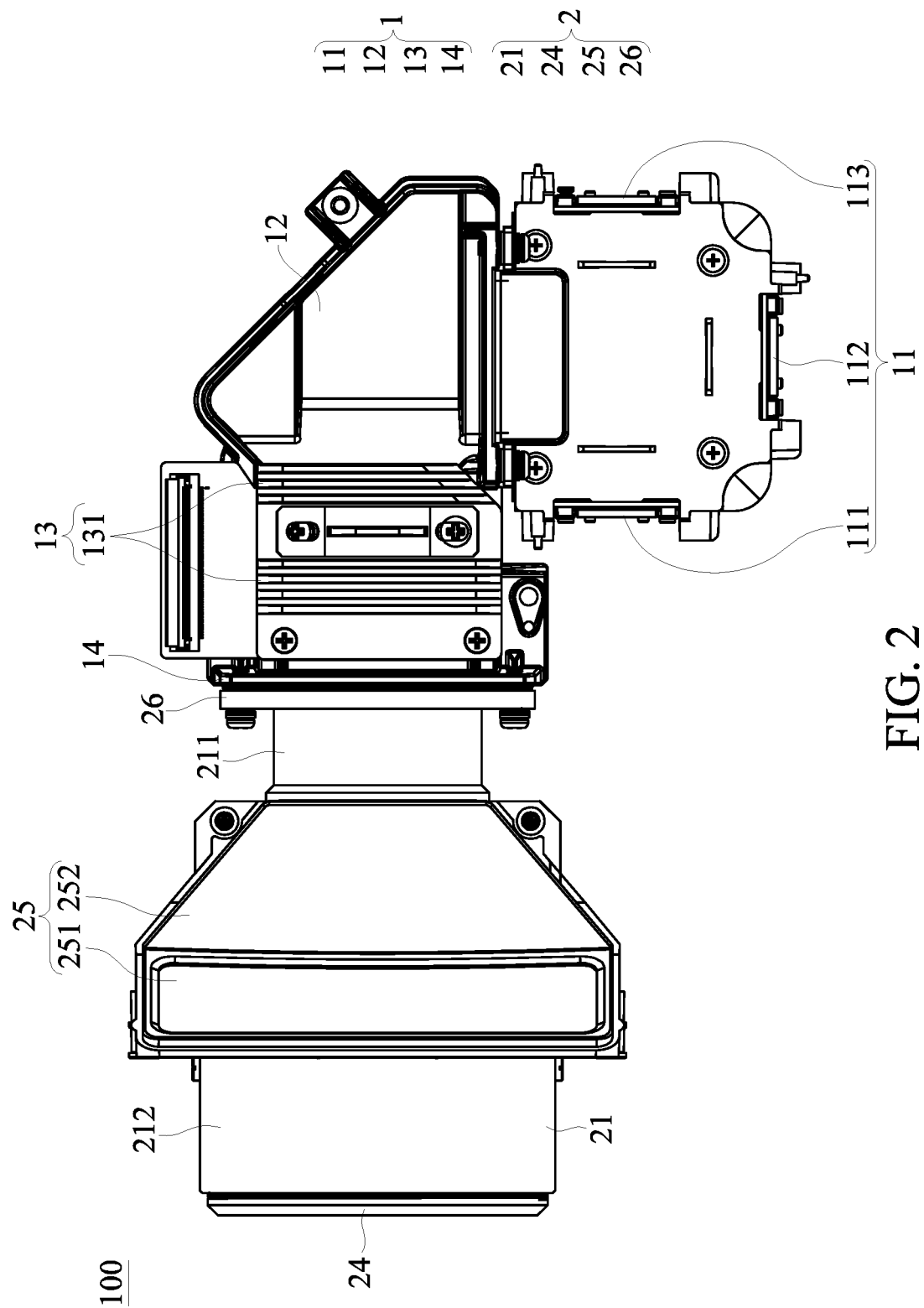
FIG. 2 is a top view showing the projector device according to the embodiment of the present disclosure.
Figure 6:
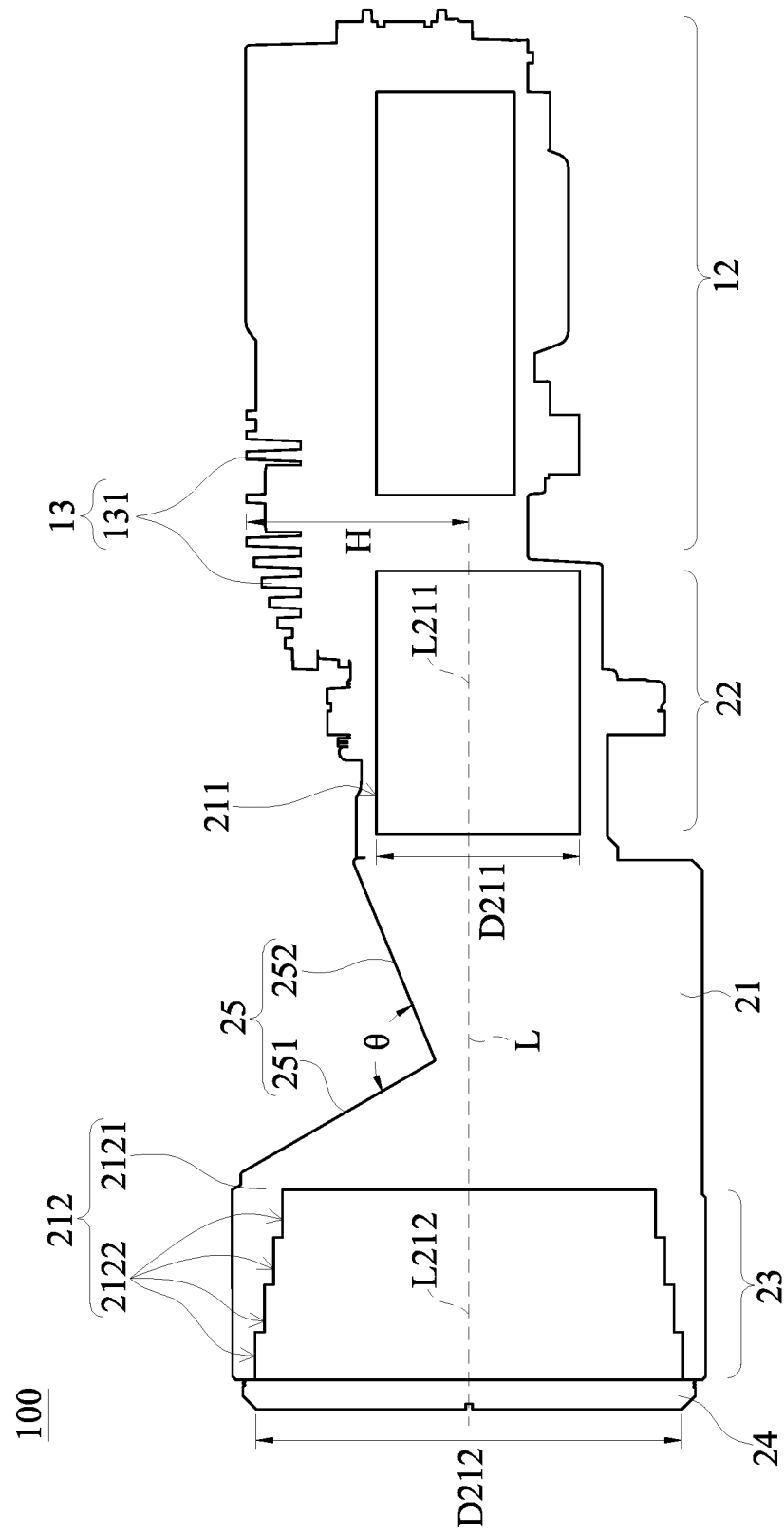
FIG. 6 is a schematic diagram showing a first annular receiving groove and a second annular receiving groove of the projector device according to the embodiment of the present disclosure.

Referring to FIG. 1 to FIG. 3, the illumination module 1 (also called image light beam generating module) includes a light source generator 11, an optical processor 12, a heat dissipation structure 13, and an illumination module fixing plate 14. The light source generator 11 is configured to generate the colored light beam B1. The optical processor 12 is configured to receive the colored light beam B1 and is configured to convert the colored light beam B1 into the image light beam B2. The light source generator 11 is connected to the imaging module 2 via the optical processor 12. In the present embodiment, the light source generator 11, the optical processor 12, and the imaging module 2 are preferably arranged in an L-shaped manner so as to reduce the space occupied by the projector device 100 in a length direction, but the present disclosure is not limited thereto. In addition, the heat dissipation structure 13 is located at a side of the optical processor 12 or is located at a side of the relay optical system 22 as described below. Referring to FIG. 4 and FIG. 6, in the present embodiment, the heat dissipation structure 13 is partially located on the upper side of the optical processor 12 and is partially located on the upper side of the relay optical system 22, but the present disclosure is not limited thereto.

In more detail, the light source generator 11 is a solid-state light source or a solid-state light source module. The solid-state light source may be, for example, a light emitting diode (LED) or a laser diode (LD). The solid-state light source or the solid-state light source module can be used to reduce the oversized volume of the projection light source (i.e. halogen bulb) of the conventional projector device. In the present embodiment, the light source generator 11 is a solid-state light source module, and includes a red light emitting diode 111, a green light emitting diode 112, and a blue light emitting diode 113. The red light emitting diode 111 is configured to generate a red light, the green light emitting diode 112 is configured to generate a green light, and the blue light emitting diode 113 is configured to generate a blue light.

The optical processor 12 includes a light combining element (not shown), a light homogenizing element (i.e. a fly-eye lens, not shown), a reflecting element 121 (i.e. a mirror), a light transmitting element 122 (i.e. a condenser lens), a prism assembly 123, and a digital micro-mirror device (DMD) 124. The light combining element is configured to receive the red light, the green light, and the blue light generated by the light source generator 11, and is configured to mix the red light, the green light, and the blue light to generate the colored light beam B1 having three primary colors (RGB). In addition, the light combining element is configured to transmit the colored light beam B1 to the light homogenizing element. The light homogenizing element is configured to homogenize the colored light beam B1 to eliminate the light spot of the colored light beam B1, and is configured to transmit the colored light beam B1 to the reflecting element 121. The reflecting element 121 is substantially disposed at a corner of the projector device 100 having an L-shape. The reflecting element 121 is configured to reflect the colored light beam B1 to the light transmitting element 122. The light transmitting element 122 is configured to focus the colored light beam B1 and is configured to transmit the colored light beam B1 to the prism assembly 123.

Reference is next made to FIG. 4, in which the prism assembly 123 is disposed at one end of the optical processor 12 close to the imaging module 2 (i.e. the left end of the optical processor 12 as shown in FIG. 4). The prism assembly 123 includes a first prism 1231, a second prism 1232, and a reflecting film 1234. The second prism 1232 is abutted or closely attached on the first prism 1231, and an interface between the first prism 1231 and the second prism 1232 is defined as a reflecting surface 1233. The reflecting film 1234 is disposed at a side of the first prism 1231 away from the second prism 1232 and is closely attached on the first prism 1231. In the present embodiment, the second prism 1232 is closely attached on an upper side of the first prism 1231, and the reflecting film 1234 is closely attached on a lower side of the first prism 1231. Therefore, the optical processor 12 of the present embodiment is capable of reducing the volume of the projector device 100 through the arrangement of the above-mentioned prism assembly 123 with a pair of prisms so as to miniaturize the size of the projector device 100 and reduce the weight of the projector device 100. It is worth mentioning that the prism assembly 123 may be an RTIR prism, the reflecting surface 1233 may be a total reflecting surface, and the reflecting film 1234 may be a dielectric reflecting layer, a silver layer, or an aluminized layer, but the present disclosure is not limited thereto.

According to the above configurations, the colored light beam B1 generated by the light source generator 11 is capable of passing through the first prism 1231, being reflected by the reflecting surface 1233, and traveling toward the reflecting film 1234 after passing through the light transmitting element 122. The reflecting film 1234 is configured to reflect the colored light beam B1 such that the colored light beam B1 sequentially passes through the first prism 1231 and the second prism 1232 and is outputted toward a side of the second prism 1232 away from the first prism 1231. As shown in FIG. 4, the colored light beam B1 is outputted toward the upper side of the second prism 1232.

The digital micro-mirror device 124 is disposed at a side of the second prism 1232 away from the first prism 1231. As shown in FIG. 4, the digital micro-mirror device 124 is disposed at the upper side of the prism assembly 123, and is disposed between the prism assembly 123 and the heat dissipation structure 13. The digital micro-mirror device 124 is configured to receive the colored light beam B1 outputted from the second prism 1232, convert the colored light beam B1 into the image light beam B2, and transmit the image light beam B2 to the imaging module 2.

Referring to FIG. 4 and FIG. 6, the heat dissipation structure 13 has a plurality of heat dissipation fins 131. The heat dissipation structure 13 is configured to dissipate the heat energy (i.e. the heat energy generated from the digital micro-mirror device 124) accumulated on the optical processor 12 or the relay optical system 22, thereby improving the reliability of the projector device 100. It is worth mentioning that the heat dissipation fins 131 of the heat dissipation structure 13 have a specific matching relationship with the light guiding surface 252 of the light outputting structure 25 as described below. The specific matching relationship will be described in more detail below.

Further referring to FIG. 1 to FIG. 3, the illumination module fixing plate 14 is connected to a side of the optical processor 12 (i.e. left side). The illumination module fixing plate 14 is substantially in a rectangular shape and has a hollow structure (not shown). The hollow structure is configured to enable the image light beam B2 to pass through.

Referring to FIG. 1 to FIG. 4, the imaging module 2 (also called image light beam projecting module) includes a housing 21, a relay optical system 22, a projection optical system 23, a cover 24, a light outputting structure 25, and an imaging module fixing plate 26.

The housing 21 has a first annular receiving groove 211 and a second annular receiving groove 212. In the present embodiment, the first annular receiving groove 211 and the second annular receiving groove 212 are all in an annular shape (or a hollow cylindrical shape), but the present disclosure is not limited thereto. More specifically, the first annular receiving groove 211 and the second annular receiving groove 212 are spaced apart from each other, the first annular receiving groove 211 is closer to the illumination module 1 than the second annular receiving groove 212. Moreover, since the first annular receiving groove 211 and the second annular receiving groove 212 of the present embodiment are all in an annular shape (or a hollow cylindrical shape), the first annular receiving groove 211 defines a center axis line L211, and the second annular receiving groove 212 also defines a center axis line L211. The center axis line L211 of the first annular receiving groove 211 and the center axis line L212 of the second annular receiving groove 212 are located on the same axis line L.

Referring to FIG. 6, in the present embodiment, a diameter D211 of the first annular receiving groove 211 is smaller than a diameter D212 of the second annular receiving groove 212, and the diameter D211 of the first annular receiving groove 211 is 0.2 times to 0.8 times of the diameter D212 of the second annular receiving groove 212. Preferably, the diameter D211 of the first annular receiving groove 211 is 0.4 times to 0.6 times of the diameter D212 of the second annular receiving groove 212, but the present disclosure is not limited thereto.

More specifically, an inner wall of the second annular receiving groove 212 includes a ladder structure 2121, the ladder structure 2121 has a plurality of stairs (not labeled), the stairs respectively surround a plurality of sub-annular receiving grooves 2122, and diameters (not labeled) of the sub-annular receiving grooves 2122 decrease from the projection optical system 23 toward the relay optical system 22.

Further referring to FIG. 4, the relay optical system 22 is configured to receive the image light beam B2 emitted from the illumination module 1 and is configured to transmit the image light beam B2 to the projection optical system 23 according to the required optical effect. In more detail, the relay optical system 22 includes at least one lens 221. The lens 221 of the relay optical system 22 is received in the first annular receiving groove 211 and is fixed to (or engaged to) the inner wall of the first annular receiving groove 211. In the present embodiment, the number of the lens 221 of the relay optical system 22 is six, and the six lenses 221 are arranged from right to left in order of two single-layer lenses, two composite lenses, and two single-layer lenses.

The projection optical system 23 is configured to receive the image light beam B2 emitted from the relay optical system 22 and is configured to project the image light beam B2 onto the imaging surface P according to the required optical effect. In more detail, the projection optical system 23 includes at least one lens 231 and a reflecting mirror 232, the lens 231 and the reflecting mirror 232 of the projection optical system 23 are received in the second annular receiving groove 212 and are fixed to (or engaged to) the inner wall of the second annular receiving groove 212. The lens 231 of the projection optical system 23 is located between the reflecting mirror 232 and the relay optical system 22. In the present embodiment, the number of the lens 231 of the projection optical system 23 is three, and the three lenses 231 are arranged from right to left in order of one single-layer lens, one composite lens, and one single-layer lens. Preferably, one surface of the reflecting mirror 232 (i.e. the right surface of the reflecting mirror 232 as shown in FIG. 4) faces the relay optical system 22 and is a concave mirror surface, and more preferably an aspherical concave mirror surface.

It should be noted that the numbers and shapes of the lenses 221, 231 and the reflecting mirror 232 of the relay optical system 22 and the projection optical system 23 may be adjusted and changed according to the design requirements of different optical paths, and the present disclosure is not limited thereto.

Further, since the center axis line L211 of the first annular receiving groove 211 and the center axis line L212 of the second annular receiving groove 212 are located on the same axis line L, when the lens 221 of the relay optical system 22 is received in the first annular receiving groove 211, and when the lens 231 and the reflecting mirror 232 of the projection optical system 23 are received in the second annular receiving groove 212, a mirror center C221 of the lens 221 of the relay optical system 22, a mirror center C231 of the lens 231 of the projection optical system 23, and a mirror center C232 of the reflecting mirror 232 can be more easily aligned with the axis line L. Accordingly, the optical elements of the imaging module 2 are in a coaxial arrangement, and the integration of the projector device 100 can be effectively improved.

In the present embodiment, the diameter of the lens 221 of the relay optical system 22 is smaller than the diameter of the lens 231 of the projection optical system 23, and is also smaller than the diameter of the reflecting mirror 232. Preferably, the diameter of the lens 221 of the relay optical system 22 corresponds in size to the diameter of the first annular receiving groove 211. In addition, the diameters of the lens 231 and the reflecting mirror 232 of the projection optical system 23 respectively correspond in size to the diameters of the sub-annular receiving grooves 2122 such that the lens 231 and the reflecting mirror 232 of the projection optical system 23 can be respectively and firmly engaged with the sub-annular receiving grooves 2122. It is worth mentioning that since the diameters (not labeled) of the sub-annular receiving grooves 2122 of the present embodiment are decreased from the projection optical system 23 toward the relay optical system 22, the lens 231 and the reflecting mirror 232 of the projection optical system 23 can be sequentially assembled into the sub-annular receiving grooves 2122 of the second annular receiving groove 212 from one end of the housing 21 away from the relay optical system 22 (i.e. from the left end of the housing 21 as shown in FIG. 4). Accordingly, the assembly efficiency of optical elements can be effectively improved.

According to the above configurations, the image light beam B2 generated by the illumination module 1 is capable of sequentially passing through the lens 221 of the relay optical system 22 and the lens 231 of projection optical system 23 and being reflected by the reflecting mirror 232. After being reflected by the reflecting mirror 232, the image light beam B2 is capable of passing through the lens 231 of projection optical system 23 again and being projected onto the imaging surface P.

The imaging module 2 of the present embodiment is capable of effectively reducing the volume of the projector device 100 by virtue of the optical element arrangement and the optical path design of the relay optical system 22 and the projection optical system 23, so as to miniaturize the size of the projector device 100 and reduce the weight of the projector device 100.

Further referring to FIG. 4, the cover 24 is detachably mounted on the housing 21 and is configured to close off one end of the housing 21 away from the illumination module 1 (i.e. the left end of the housing 21 as shown in FIG. 4). In more detail, the joint portion between the cover 24 and the housing 21 may have a corresponding screw structure such that the cover 24 can be detachably screwed onto the housing 21; or the joint portion between the cover 24 and the housing 21 may have a corresponding concave-convex engagement structure such that the cover 24 can be detachably engaged with the housing 21, and the present disclosure is not limited thereto. In the present embodiment, the other surface of the reflecting mirror 232 (i.e. the left surface of the reflecting mirror 232 as shown in FIG. 4) faces away from the relay optical system 22 and abuts against the cover 24. Accordingly, the stability of the reflecting mirror 232 fixed in the housing 21 is effectively improved so as to avoid the occurrence of displacement of the reflecting mirror 232 due to shaking or impact.

Further referring to FIG. 3 and FIG. 4, the light outputting structure 25 is disposed between the first annular receiving groove 211 and the second annular receiving groove 212 and is located at a side of the axis line L (i.e. the upper side of the axis line L as shown in FIG. 4). The light outputting structure 25 has a light outputting surface 251 and a light guiding surface 252 connected to the light outputting surface 251. The light outputting surface 251 is closer to the second annular receiving groove 212 than the light guiding surface 252. The light outputting surface 251 is configured to allow the image light beam B2 from the illumination module 1 (or from the projection optical system 23) to pass through such that the image light beam B2 is projected onto the imaging surface P. The light guiding surface 252 is configured to restrict a projection range of the image light beam B2 projected onto the imaging surface P. Both the light outputting surface 251 and the light guiding surface 252 are non-parallel to the axis line L, and an included angle θ formed between the light outputting surface 251 and the light guiding surface 252 ranges from 60 degrees to 120 degrees. Preferably, the included angle θ formed between the light outputting surface 251 and the light guiding surface 252 ranges from 80 degrees to 100 degrees. The light outputting surface 251 may be, for example, a glass light transmission window or a hollow light transmission window. Preferably, the light outputting surface 251 is the glass light transmission window so as to protect the optical elements in the projection optical system 23 and prevent dust from falling into the imaging module 2 without affecting the image light beam B2.

It is worth mentioning that the heat dissipation fins 131 of the heat dissipation structure 13 described above have a specific matching relationship with the light guiding surface 252 of the light outputting structure 25. In more detail, the heat dissipation structure 13 and the light outputting structure 25 of the imaging module 2 are located on the same side with respect to the axis line L (i.e. the upper side of the axis line L as shown in FIG. 4). The heat dissipation fins 131 define a plurality of heights H with respect to the axis line L (as shown in FIG. 6), and at least a part of the heights H increase from the imaging module 2 toward the illumination module 1. In the present embodiment, since the number of the heat dissipation fins 131 is ten, the number of the heights H is ten. Six of the ten heights H (i.e. the six heights H from left to right as shown in FIG. 4) increase in height from the imaging module 2 toward the illumination module 1, and the other four of the ten heights H (i.e. the four heights H from right to left as shown in FIG. 4) have approximately the same height as each other.

Figure 7:
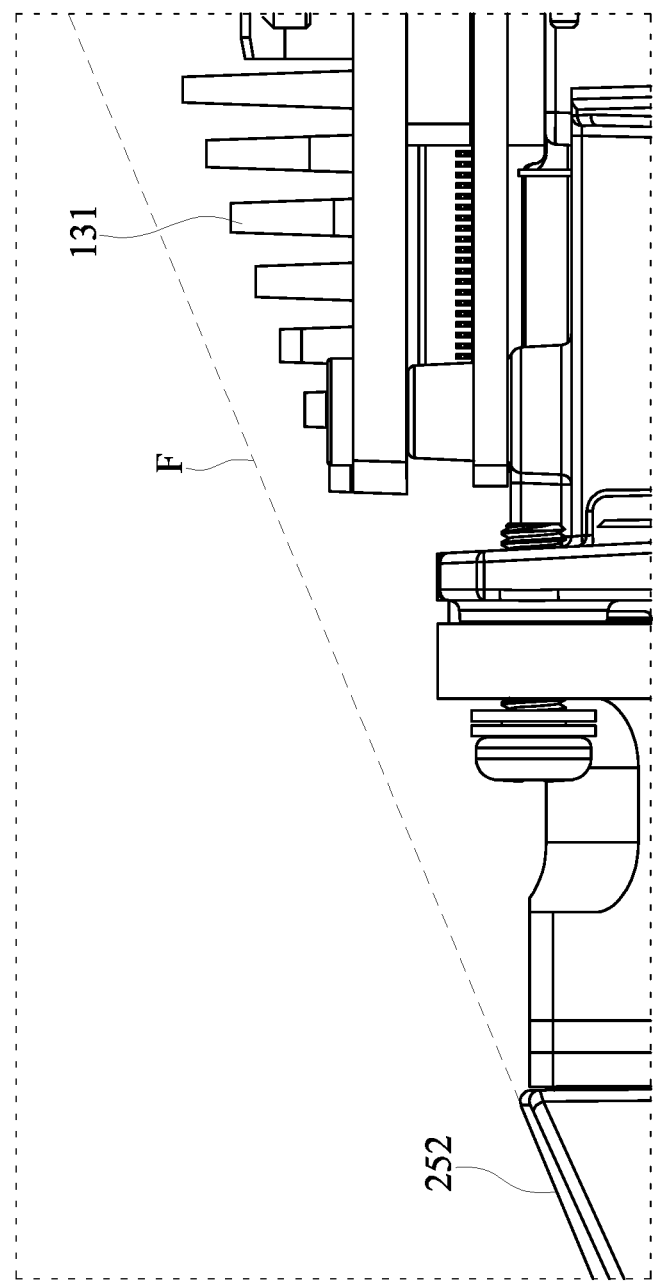
FIG. 7 is a schematic diagram showing heat dissipation fins being not extended beyond a virtual extension surface according to the embodiment of the present disclosure.
Figure 8:
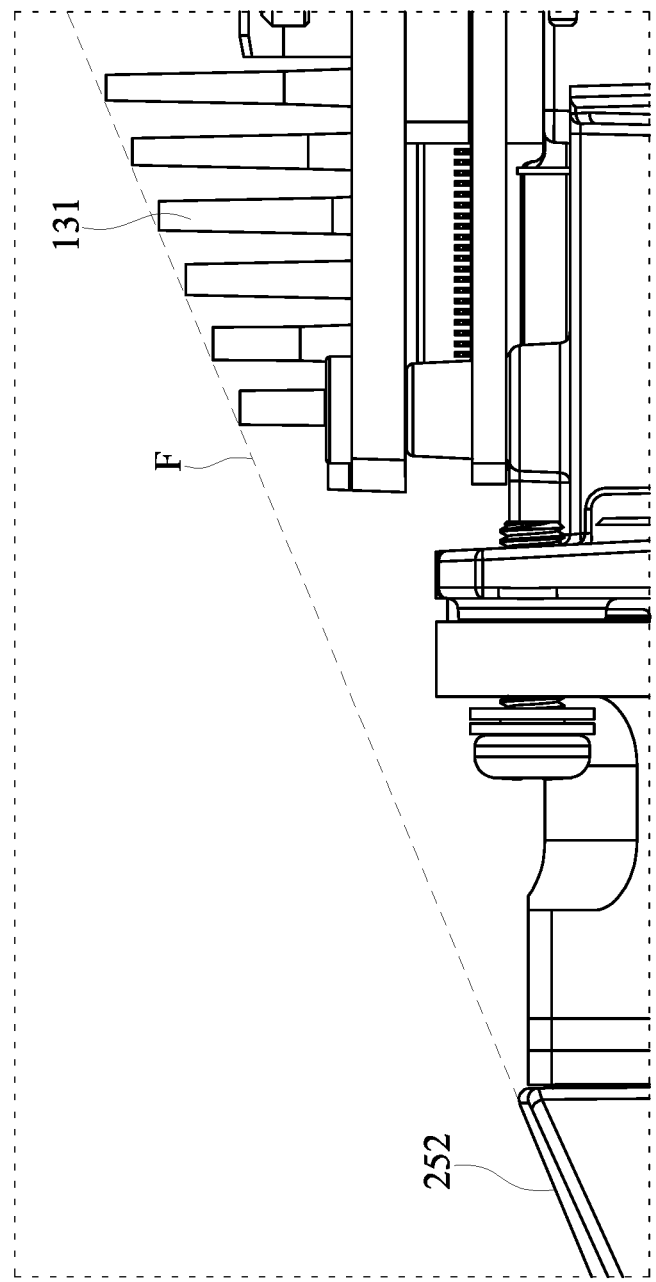
FIG. 8 is a schematic diagram showing heat dissipation fins being at least partially flush with a virtual extension surface according to another embodiment of the present disclosure.

Referring to FIG. 7 and FIG. 8, in the present embodiment, the light guiding surface 252 defines a virtual extension surface F that extends in the direction of the heat dissipation fins 131 and overlaps the light guiding surface 252. As shown in FIG. 7, in one embodiment of the present disclosure, the ends of the heat dissipation fins 131 away from the optical processor 12 does not extend beyond (not in contact with) the virtual extension surface F. As shown in FIG. 8, in another embodiment of the present disclosure, the ends of the heat dissipation fins 131 away from the optical processor 12 is at least partially flush with the virtual extension surface F. Accordingly, when the image light beam B2 passes through the light outputting surface 251 and passes over the light guiding surface 252 and is projected toward the imaging surface P, the image light beam B2 passes over the heat dissipation fins 131 and is not blocked by the heat dissipation fins 131.

The projector device 100 of the present embodiment enables the heat dissipation efficiency of the heat dissipation structure 13 to be increased without affecting the optical path of the image light beam B2 by virtue of the specific matching relationship between the heat dissipation fins 131 of the heat dissipation structure 13 and the light guiding surface 252 of the light outputting structure 25.

Further referring to FIG. 1 to FIG. 3, the imaging module fixing plate 26 is connected to a side of the housing 21 (i.e. right side). The imaging module fixing plate 26 is substantially in a rectangular shape and has a hollow structure (not shown). The hollow structure is configured to enable the image light beam B2 to pass through. Preferably, the shape of the imaging module fixing plate 26 corresponds to the shape of the illumination module fixing plate 14 such that the imaging module fixing plate 26 can be closely attached to the illumination module fixing plate 14. Moreover, the imaging module fixing plate 26 and the illumination module fixing plate 14 can be fixed to each other through a plurality of fasteners such as screws and nuts (not labeled) so as to detachably mount the imaging module 2 to the illumination module 1.

Advantageous Effects of the Present Embodiment

As described above, since the center axis line L211 of the first annular receiving groove 211 and the center axis line L212 of the second annular receiving groove 212 are located on the same axis line L, when the lens 221 of the relay optical system 22 is received in the first annular receiving groove 211, and when the lens 231 and the reflecting mirror 232 of the projection optical system 23 are received in the second annular receiving groove 212, the mirror center C221 of the lens 221 of the relay optical system 22, the mirror center C231 of the lens 231 of the projection optical system 23, and the mirror center C232 of the reflecting mirror 232 can be more easily aligned with the axis line L. Accordingly, the optical elements of the imaging module 2 can be in a coaxial arrangement, and the integration of the projector device 100 can be effectively improved.

Further, the volume of the projector device 100 of the present embodiment can be effectively reduced by virtue of the arrangement of the prism assembly 123 with a pair of prisms, and by virtue of the optical element arrangement and the optical path design of the relay optical system 22 and the projection optical system 23. Accordingly, the size of the projector device 100 can be miniaturized, and the weight of the projector device 100 can be reduced.

In addition, since one surface of the reflecting mirror 232 of the present embodiment faces away from the relay optical system 22 and abuts against the cover 24, the stability of the reflecting mirror 232 fixed in the housing 21 is effectively improved so as to avoid the occurrence of displacement of the reflecting mirror 232 due to shaking or impact.

Moreover, the projector device 100 of the present embodiment enables the heat dissipation efficiency of the heat dissipation structure 13 to be increased without affecting the optical path of the image light beam B2 by virtue of the specific matching relationship between the heat dissipation fins 131 of the heat dissipation structure 13 and the light guiding surface 252 of the light outputting structure 25.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A projector device, comprising:
an illumination module including:
a light source generator configured to generate a colored light beam; and
an optical processor configured to receive the colored light beam and convert the colored light beam into an image light beam; and
an imaging module connected to the illumination module, and being configured to receive the image light beam and project the image light beam onto an imaging surface; wherein the imaging module includes:
a housing having a first annular receiving groove and a second annular receiving groove; wherein the first annular receiving groove and the second annular receiving groove are spaced apart from each other, the first annular receiving groove is closer to the illumination module than the second annular receiving groove, and a center axis line of the first annular receiving groove and a center axis line of the second annular receiving groove are located on the same axis line;
a relay optical system including at least one lens; wherein the lens of the relay optical system is received in the first annular receiving groove; and
a projection optical system including at least one lens and a reflecting mirror; wherein the lens and the reflecting mirror of the projection optical system are received in the second annular receiving groove, and the lens of the projection optical system is located between the reflecting mirror and the relay optical system;
wherein a mirror center of the lens of the relay optical system, a mirror center of the lens of the projection optical system, and a mirror center of the reflecting mirror are located on the same axis line.

2. The projector device according to claim 1, wherein a diameter of the first annular receiving groove is smaller than a diameter of the second annular receiving groove, and the diameter of the first annular receiving groove is 0.2 times to 0.8 times of the diameter of the second annular receiving groove.

3. The projector device according to claim 1, wherein an inner wall of the second annular receiving groove includes a ladder structure, the ladder structure has a plurality of stairs, the stairs respectively surround a plurality of sub-annular receiving grooves, and diameters of the sub-annular receiving grooves decrease from the projection optical system toward the relay optical system.

4. The projector device according to claim 1, wherein the imaging module further includes a cover, the cover is detachably mounted on the housing and is configured to close off one end of the housing away from the illumination module; and wherein one surface of the reflecting mirror faces the relay optical system and is a concave mirror surface, and the other surface of the reflecting mirror faces away from the relay optical system and abuts against the cover.

5. The projector device according to claim 1, wherein the imaging module further includes a light outputting structure, and the light outputting structure is disposed between the first annular receiving groove and the second annular receiving groove and is located at a side of the axis line; wherein the light outputting structure has a light outputting surface and a light guiding surface connected to the light outputting surface; wherein the light outputting surface is configured to allow the image light beam from the illumination module to pass through such that the image light beam is projected onto the imaging surface; wherein the light guiding surface is configured to restrict a projection range of the image light beam projected onto the imaging surface; and wherein both the light outputting surface and the light guiding surface are non-parallel to the axis line, and an included angle formed between the light outputting surface and the light guiding surface ranges from 60 degrees to 120 degrees.

6. The projector device according to claim 5, wherein the illumination module further includes a heat dissipation structure, the heat dissipation structure is located at a side of the optical processor or a side of the relay optical system, and the heat dissipation structure and the light outputting structure of the imaging module are located on the same side with respect to the axis line; and wherein the heat dissipation structure has a plurality of heat dissipation fins, the heat dissipation fins define a plurality of heights with respect to the axis line, and at least a part of the heights increase from the imaging module toward the illumination module.

7. The projector device according to claim 6, wherein the ends of the heat dissipation fins away from the optical processor do not extend beyond or are at least partially flush with a virtual extension surface that overlaps the light guiding surface.

8. The projector device according to claim 6, wherein when the image light beam passes through the light outputting surface and passes over the light guiding surface and is projected toward the imaging surface, the image light beam passes over the heat dissipation fins and is not blocked by the heat dissipation fins.

9. The projector device according to claim 1, wherein the optical processor further includes:
  a prism assembly disposed at an end of the optical processor close to the imaging module, and the prism assembly including:
    a first prism;
    a second prism abutted on the first prism; wherein an interface between the first prism and the second prism is defined as a reflecting surface; and
    a reflecting film disposed at a side of the first prism away from the second prism;
    wherein the colored light beam generated by the light source generator is capable of passing through the first prism, being reflected by the reflecting surface, and traveling toward the reflecting film; and wherein the reflecting film is configured to reflect the colored light beam such that the colored light beam sequentially passes through the first prism and the second prism, and is outputted toward a side of the second prism away from the first prism; and
  a digital micro-mirror device disposed at a side of the second prism away from the first prism; wherein the digital micro-mirror device is configured to receive the colored light beam outputted from the second prism, convert the colored light beam into the image light beam, and transmit the image light beam to the imaging module.

10. The projector device according to claim 1, wherein the image light beam generated by the illumination module is capable of sequentially passing through the lens of the relay optical system and the lens of projection optical system and being reflected by the reflecting mirror; and wherein after being reflected by the reflecting mirror, the image light beam is capable of passing through the lens of projection optical system again and being projected onto the imaging surface.

* * * * *